(12) United States Patent
Lin

(10) Patent No.: US 12,201,904 B2
(45) Date of Patent: Jan. 21, 2025

(54) METHOD AND APPARATUS FOR A CONTROL INTERFACE IN A VIRTUAL ENVIRONMENT

(71) Applicant: Tencent Technology (Shenzhen) Company Limited, Guangdong (CN)

(72) Inventor: Lingyun Lin, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 274 days.

(21) Appl. No.: 17/883,323

(22) Filed: Aug. 8, 2022

(65) Prior Publication Data

US 2022/0379214 A1 Dec. 1, 2022

Related U.S. Application Data

(63) Continuation of application No. PCT/CN2021/113710, filed on Aug. 20, 2021.

(30) Foreign Application Priority Data

Aug. 26, 2020 (CN) .......................... 202010870309.1

(51) Int. Cl.
*A63F 13/537* (2014.01)
*A63F 13/837* (2014.01)

(52) U.S. Cl.
CPC .......... *A63F 13/537* (2014.09); *A63F 13/837* (2014.09)

(58) Field of Classification Search
CPC .......... A63F 13/20; A63F 13/22; A63F 13/23; A63F 13/25; A63F 13/426; A63F 13/45;
(Continued)

(56) References Cited

U.S. PATENT DOCUMENTS 9,015,366 B2 * 4/2015 Hamada .................. A63F 13/23
710/30
2012/0260006 A1 * 10/2012 Hamada .............. G06F 13/4221
710/30

(Continued)

FOREIGN PATENT DOCUMENTS

CN 105549888 A 5/2016
CN 106126064 A 11/2016
(Continued)

OTHER PUBLICATIONS

International Search Report issued Nov. 19, 2021 in PCT/CN2021/113710 with English translation, pp. 1-11.
(Continued)

*Primary Examiner* — Omkar A Deodhar
(74) *Attorney, Agent, or Firm* — ArentFox Schiff LLP

(57) ABSTRACT

An aspect of the disclosure provides a method and an apparatus for a control interface in a virtual environment. For example, the method includes providing a graphical user interface (GUI) with a virtual environment picture of the virtual environment. The GUI includes a first graphical element and a second graphical element. The first graphical element is associated with a first control for a first virtual object and the second graphical element is associated with a second control for the first virtual object. The method further includes receiving a merge setting operation for the first graphical element and the second graphical element, and merging the first control and the second control into a third graphical element in response to the merge setting operation.

20 Claims, 12 Drawing Sheets

(58) Field of Classification Search
CPC ........ A63F 13/50; A63F 13/53; A63F 13/533; A63F 13/537; A63F 13/5375; A63F 13/55; A63F 13/56; A63F 13/70; A63F 13/837
See application file for complete search history.

(56) References Cited

U.S. PATENT DOCUMENTS

| | | | |
|---|---|---|---|
| 2013/0217453 A1* | 8/2013 | Briggs | A63F 13/213 |
| | | | 463/7 |
| 2018/0008888 A1* | 1/2018 | Kim | A63F 13/825 |
| 2019/0282895 A1* | 9/2019 | Choudhary | A63F 13/86 |
| 2020/0298110 A1* | 9/2020 | Koziel | A63F 13/42 |

FOREIGN PATENT DOCUMENTS

| | | |
|---|---|---|
| CN | 109078326 A | 12/2018 |
| CN | 111209000 A | 5/2020 |
| CN | 111921194 A | 11/2020 |
| WO | 2019201047 A1 | 10/2019 |

OTHER PUBLICATIONS

"R2 Online", Available on internet at: https://www.youtube.com/watch?v=-mteWdzo2jk, Feb. 3, 2015, 2 pages.
Office Action received for Korean Patent Application No. 10-2022-7040140, mailed on Jul. 24, 2024, 13 pages (7 pages of English Translation and 6 pages of Original Document).

* cited by examiner

METHOD AND APPARATUS FOR A CONTROL INTERFACE IN A VIRTUAL ENVIRONMENT

RELATED APPLICATIONS

The present application is a continuation of International Application No. PCT/CN2021/113710, entitled "METHOD AND APPARATUS FOR DISPLAYING VIRTUAL ENVIRONMENT PICTURE, AND DEVICE AND STORAGE MEDIUM," and filed on Aug. 20, 2021, which claims priority to Chinese Patent Application No. 202010870309.1, entitled "DISPLAY METHOD AND APPARATUS FOR VIRTUAL ENVIRONMENT PICTURE, DEVICE, AND STORAGE MEDIUM" and filed on Aug. 26, 2020. The entire disclosures of the prior applications are hereby incorporated by reference in their entirety.

FIELD OF THE TECHNOLOGY

This application relates to the field of human-computer interaction, including a method, an apparatus, a device and a storage medium for controlling in a virtual environment.

BACKGROUND OF THE DISCLOSURE

In a virtual environment-based application, such as a first-person shooting game, a user may control a virtual object to perform actions, such as squatting, lying down, shooting, and running.

A virtual environment picture is displayed during running of a game, and a plurality of user interface controls (UI controls or graphical elements associated with the controls) are displayed as a graphical user interface (GUI) on the virtual environment picture. The plurality of UI controls are distributed on the virtual environment picture according to a specific layout. Each UI control is used for controlling a virtual object to perform one action. For example, a UI control 1 controls a virtual object to perform a squatting action and a UI control 2 controls a virtual object to perform a lying down action.

In the technical solution, when there are many UI controls, the layout of the UI controls on the virtual environment picture is usually complex, and the efficiency of human-computer interaction is low.

SUMMARY

Embodiments of this disclosure include methods and apparatuses for controlling in a virtual environment, which improve the efficiency of human-computer interaction by changing a layout of UI controls.

An aspect of this disclosure provides a method for a control interface in a virtual environment. The method includes providing a graphical user interface (GUI) with a virtual environment picture of the virtual environment. The GUI includes a first graphical element and a second graphical element. The first graphical element is associated with a first control for a first virtual object and the second graphical element is associated with a second control for the first virtual object. The method further includes receiving a merge setting operation for the first graphical element and the second graphical element, and merging the first control and the second control into a third graphical element in response to the merge setting operation.

Another aspect of this disclosure provides an apparatus. The apparatus includes processing circuitry configured to provide a graphical user interface (GUI) with a virtual environment picture of a virtual environment. The GUI includes a first graphical element and a second graphical element. The first graphical element is associated with a first control for a first virtual object and the second graphical element is associated with a second control for the first virtual object. The processing circuitry receives a merge setting operation for the first graphical element and the second graphical element, and merges the first control and the second control into a third graphical element in response to the merge setting operation.

Another aspect of this disclosure provides a non-transitory computer-readable storage medium, storing at least one instruction, at least one program, a code set, or an instruction set, the at least one instruction, the at least one program, the code set, or the instruction set being loaded and executed by a processor, to perform the method for controlling the virtual environment according to the foregoing aspects.

Another aspect of this disclosure provides a computer program product or a computer program, the computer program product or the computer program including computer instructions, stored in a computer-readable storage medium. A processor of a computer device reads the computer instructions from the computer-readable storage medium, and the processor executes the computer instructions, so that the computer device performs the method for controlling in the virtual environment according to the foregoing aspects.

The technical solutions provided in the embodiments of this disclosure achieve at least the following beneficial effects:

Through a received merge setting operation, controls of different types displayed on a virtual environment picture are merged, so that a user can, through autonomous setting, merge UI controls that are not frequently used into a same UI control or merge UI controls that need to be used together into a same UI control, the layout of the UI controls on the virtual environment picture is simplified by merging the UI controls, thereby simplifying the process of controlling a virtual object by the user and improving the efficiency of human-computer interaction.

BRIEF DESCRIPTION OF THE DRAWINGS

The following describes technical solutions in embodiments of this disclosure with reference to the accompanying drawings. The described embodiments are some of the embodiments of this disclosure rather than all of the embodiments. Other embodiments are within the scope of this disclosure.

DESCRIPTION OF EMBODIMENTS

Figure 1:
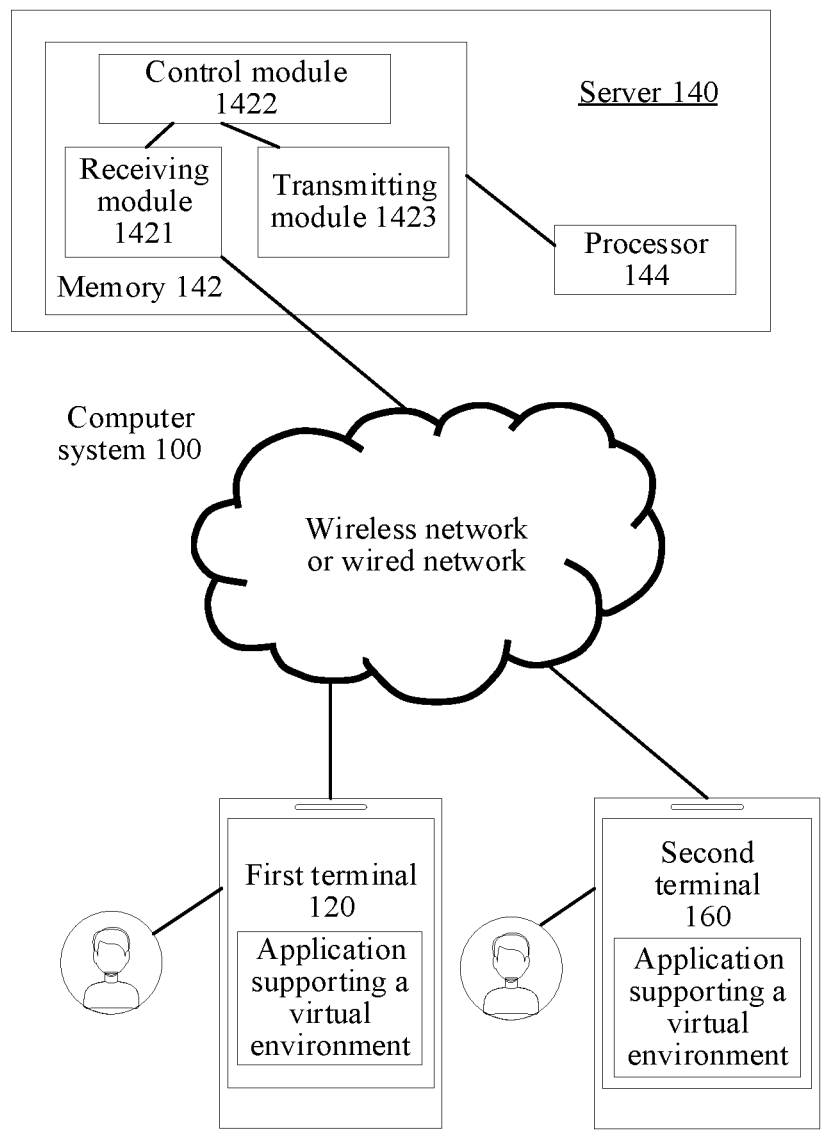
FIG. 1 is a block diagram of a computer system according to an exemplary embodiment of this disclosure.

To make objectives, technical solutions, and advantages of this disclosure clearer, the following further describes implementations of this disclosure in detail with reference to the accompanying drawings.

First, terms involved in the embodiments of this disclosure are introduced:

A virtual environment can be a virtual environment displayed (or provided) by an application when run on a terminal. The virtual environment may be a simulated environment of a real world, or may be a semi-simulated semi-fictional environment, or may be an entirely fictional environment. The virtual environment may be any one of a two-dimensional virtual environment, a 2.5-dimensional virtual environment, and a 3D virtual environment. This is not limited in this disclosure. A description is made by using an example in which the virtual environment is a 3D virtual environment in the following embodiments.

A virtual object can be a movable object in the virtual environment. The movable object may be a virtual character, a virtual animal, a cartoon character, or the like, such as a character, an animal, a plant, an oil drum, a wall, a stone, or the like displayed in a 3D virtual environment. In some examples, the virtual object is a three-dimensional model created based on a skeletal animation technology. Each virtual object has a respective shape and size in the three-dimensional virtual environment, and occupies some space in the three-dimensional virtual environment. The virtual object generically refers to one or more virtual objects in a virtual environment.

A user interface (UI) control can refer to any visual control or element that can be seen on a user interface of an application, for example, controls such as an image, an input box, a text box, a button, and a label. Some UI controls respond to user operations. For example, a user can enter text in the input box. A user can exchange information with the user interface through the UI controls.

The method provided in this disclosure may be applied to a virtual reality application, a three-dimensional map program, a military simulation program, a first-person shooting game (FPS), a multiplayer online battle arena game (MOBA), an escape shooting game, a virtual reality (VR) application program, or an augmented reality (AR) program. The following embodiments are described based on an application scenario in a game as an example.

A virtual environment-based game is composed of one or more maps of a game world. A virtual environment in the game simulates a scene of the real world. A user may control a virtual object in the game to perform actions such as walking, running, jumping, shooting, fighting, driving, being attacked by another virtual object, being injured in the virtual environment, attacking another virtual object, using an interference throwing prop, and rescuing a teammate of a same team in the virtual environment, which is highly interactive, and a plurality of users may form a team online for a competitive game. A virtual environment picture corresponding to the game is displayed on a terminal used by a user. The virtual environment picture is obtained by observing the virtual environment from a perspective of the virtual object controlled by the user. A plurality of UI controls are displayed on the virtual environment picture to form a user interface. Each UI control is used for controlling the virtual object to perform a different action. For example, a user triggers a UI control 1 to control a virtual object to run forward.

FIG. 1 is a structural block diagram of a computer system according to an exemplary embodiment of this disclosure. The computer system 100 includes a first terminal 120, a server 140, and a second terminal 160.

An application supporting a virtual environment is installed and run on the first terminal 120. The first terminal 120 is a terminal used by a first user. The first user uses the first terminal 120 to control a first virtual object in the virtual environment to perform an activity, including but not limited to: at least one of body posture adjusting, walking, running, jumping, riding, aiming, picking up, using a throwing type prop, and attacking another virtual object. For example, the first virtual object is a first virtual character, such as a simulated character object or a cartoon character object.

The first terminal 120 is connected to the server 140 through a wireless network or a wired network.

The server 140 includes at least one of one server, a plurality of servers, a cloud computing platform, and a virtualization center. For example, the server 140 includes a processor 144 and a memory 142. The memory 142 further includes a receiving module 1421, a control module 1422, and a transmitting module 1423. The receiving module 1421 is configured to receive a request transmitted by a client, for example, a team-up request. The control module 1422 is configured to control rendering of a virtual environment picture. The transmitting module 1423 is configured to transmit a response to the client, for example, transmitting team-up successful prompt information. The server 140 is configured to provide a backend service for an application program supporting a three-dimensional virtual environment. In some examples, the server 140 is responsible for primary computing work, and the first terminal 120 and the second terminal 160 are responsible for secondary computing work; or the server 140 is responsible for secondary computing work, and the first terminal 120 and the second terminal 160 are responsible for primary computing work; or the server 140, the first terminal 120 and the second terminal 160 perform collaborative computing by using a distributed computing architecture among each other.

The server 140 may use a synchronization technology to enable picture performance of a plurality of clients to be consistent. For example, the synchronization technology used by the server 140 includes: a status synchronization technology or a frame synchronization technology.

Status Synchronization Technology

Figure 2:
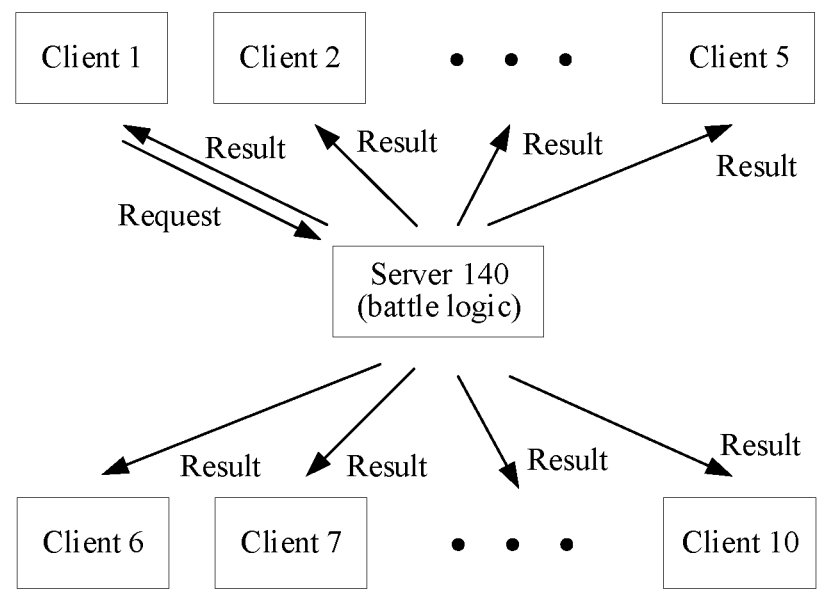
FIG. 2 is a schematic diagram of a status synchronization technology according to an exemplary embodiment of this disclosure.

In an embodiment based on FIG. 1, the server 140 performs synchronization among a plurality of clients using the status synchronization technology. As shown in FIG. 2, battle logic is run in the server 140. When status of a virtual object in a virtual environment changes, the server 140 transmits a status synchronization result to all clients, for example, a client 1 to a client 10.

In an example, when the client 1 transmits to the server 140 a request, which is used for requesting a virtual object 1 to perform an action of attacking a virtual object 2, the server 140 determines whether the virtual object 1 can attack the virtual object 2 and a remaining life value of the virtual object 2 after the virtual object 1 performs the action of attacking. The server 140 synchronizes the remaining life value of the virtual object 2 to all the clients, and all the clients update local data and interface performance according to the remaining life value of the virtual object 2.

Frame Synchronization Technology

Figure 3:
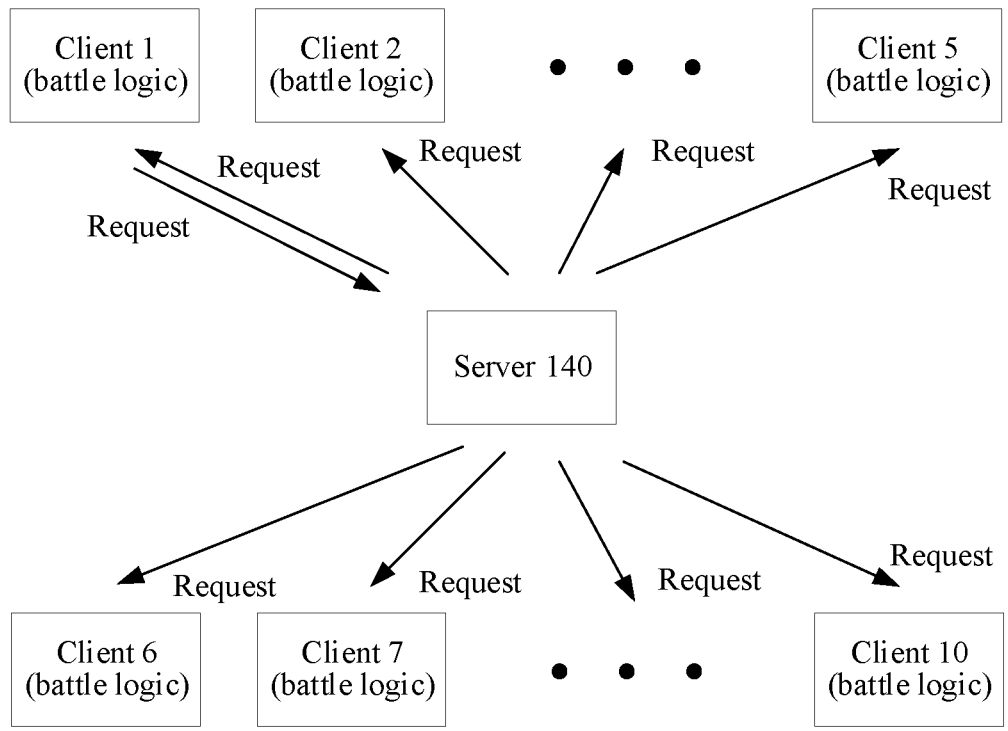
FIG. 3 is a schematic diagram of a frame synchronization technology according to an exemplary embodiment of this disclosure.

In an embodiment based on FIG. 1, the server 140 performs synchronization among a plurality of clients using the frame synchronization technology. As shown in FIG. 3, battle logic is run in the clients. The clients transmit to the server 140 frame synchronization requests, which carry local data changes of the clients. After receiving a frame synchronization request, the server 140 forwards the frame synchronization request to all the clients. After receiving the frame synchronization request, each client processes the frame synchronization request according to local battle logic and updates local data and interface performance.

An application program supporting a virtual environment is installed and run on the second terminal 160. The second terminal 160 is a terminal used by a second user. The second user uses the second terminal 160 to control a second virtual object in the virtual environment to perform an activity, including but not limited to: at least one of body posture adjusting, walking, running, jumping, riding, aiming, picking up, using a throwing type prop, and attacking another virtual object. For example, the second virtual object is a second virtual character, such as a simulated character object or a cartoon character object.

In some examples, the first virtual object and the second virtual object are located in the same virtual environment. In some examples, the first virtual object and the second virtual object may belong to the same team, the same organization, the same camp, have a friend relationship with each other, or have a temporary communication permission. Alternatively, the first virtual character object and the second virtual character object may belong to different camps, different teams, or different organizations, or have a hostile relationship with each other.

In some examples, the application programs installed on the first terminal 120 and the second terminal 160 are the same, or the application programs installed on the two terminals are the same type of application programs installed on different operating system platforms (Android or IOS). The first terminal 120 may be generally one of a plurality of terminals, and the second terminal 160 may be generally one of a plurality of terminals. In this embodiment, only the first terminal 120 and the second terminal 160 are used as examples for description. The first terminal 120 and the second terminal 160 are of the same or different device types. The device type includes at least one of a smartphone, a tablet computer, an e-book reader, a moving picture experts group audio layer III (MP3) player, a moving picture experts group audio layer IV (MP4) player, a laptop, and a desktop computer. The following embodiment is described by using an example that the terminal includes a smartphone.

It is noted that there may be more or fewer terminals. For example, there may be only one terminal, or there may be dozens of or hundreds of terminals or more. The quantity and the device type of the terminals are not limited in the embodiments of this disclosure.

Figure 4:
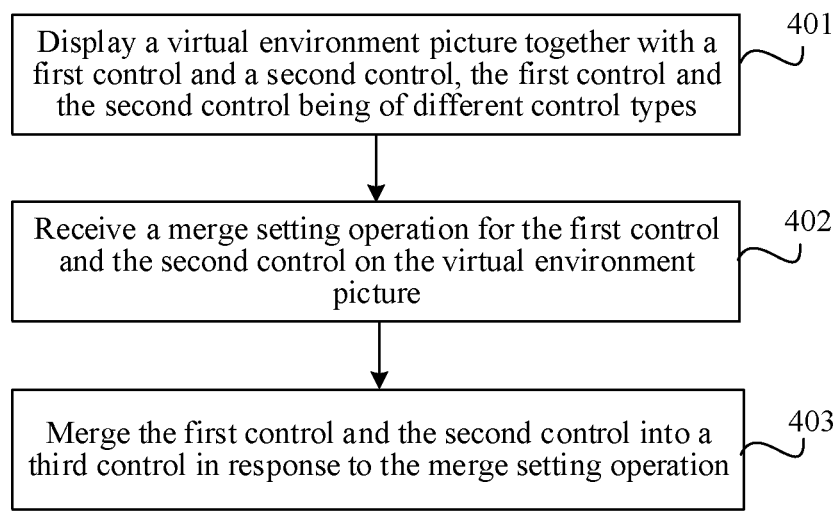
FIG. 4 is a flowchart of a display method for a virtual environment picture according to an exemplary embodiment of this disclosure.

FIG. 4 is a flowchart of a method for providing a virtual environment picture with a graphical user interface (GUI) for a virtual environment according to an exemplary embodiment of this disclosure. The method can be applied to a computer device. A description is provided by implementing the computer device as the first terminal 120 or the second terminal 160, or another terminal in the computer system 100 in FIG. 1. The method includes the following steps:

In step 401: a virtual environment picture together with a first control (e.g., a first graphical element associated with the first control) and a second control (e.g., a second graphical element associated with the second control), the first control and the second control are of different control types.

In some embodiments, the first control is used for controlling a first virtual object to perform a first action and the second control is used for controlling the first virtual object to perform a second action. The first action and the second action are actions of different types; or, the first action and the second action are different actions.

For example, the first control is used for controlling the first virtual object to perform first performance in the virtual environment; or, the first control is used for controlling the first virtual object to use a first prop in the virtual environment; or, the first control is used for controlling the first virtual object to trigger a first skill; or, the first control is used for controlling the first virtual object to be in a first moving state. Similarly, the second action corresponding to the second control includes second performance, using a second prop, triggering a second skill, being in a second moving state, and the like. Control functions of the first control and the second control are not limited in this embodiment.

An application that supports a virtual environment, for example, a first-person shooting game, is run on a terminal used by a user. For example, in a game application, during running of the game application, a virtual environment picture is displayed, and the virtual environment picture is a picture obtained by observing a virtual environment from a perspective of a first virtual object. In some embodiments, the virtual environment displayed on the virtual environment picture includes at least one of the following elements: a mountain, a plain, a river, a lake, a sea, a desert, sky, a plant, a building, and a vehicle.

A control type of a UI control is mainly used for indicating a corresponding triggered function type of the UI control. The UI control is displayed on the virtual environment picture. For example, the UI control includes: at least one of an auxiliary type UI control, a moving type UI control, an aiming type UI control, and a state switching type UI control.

The auxiliary type UI control is used for assisting a virtual object in performing an activity. In some embodiments, the auxiliary type UI control is used for controlling the virtual object to use an auxiliary type virtual prop to assist the activity, or the auxiliary type UI control is used for controlling the virtual object to trigger an auxiliary type skills to assist the activity; for example, a start shooting control is an auxiliary type UI control, which is used for controlling the virtual object to use a scope prop to aim at a target during a shooting activity. The moving type UI control is used for controlling the virtual object to move in the virtual environment; for example, a direction moving control is a moving type UI control; and when the direction moving control is triggered, the virtual object moves forward, backward, left, and right in the virtual environment. The aiming type UI control is a UI control corresponding to use of a virtual prop by the virtual object. In some embodiments, the aiming type UI control is a UI control corresponding to use of an attack prop by the virtual object; for example, a shooting control is an aiming type UI control; and when the shooting control is triggered, the virtual object shoots a target. The state switching type UI control is used for switching a posture of the virtual object in the virtual environment; for example, a squatting control is a state switching type UI control; and when the squatting control is triggered, the virtual object is switched from a standing state to a squatting state, or from another posture to the squatting state.

In step 402: a merge setting operation for the first control and the second control is received.

When a user uses a terminal with a touch screen, for example, a smart phone, a tablet computer, or the like, UI controls are usually displayed on the touch screen of the terminal. For example, the user implements the merge setting operation by triggering a UI control corresponding to the merge setting operation, or the user implements a gesture operation corresponding to the merge setting operation on the touch screen, for example, a one-tap operation, a press-and-hold operation, a double-tap operation (including at least one of a single-finger double-tap operation and a multi-finger double-tap operation), a hover operation, a drag operation, and a combined operation of the above.

When the terminal used by the user is a terminal to which an external input device is connected, the merge setting operation can also be performed through the external input device. For example, the terminal is implemented as a laptop to which a mouse is connected. The user moves a mouse pointer to a UI control corresponding to the merge setting operation and implements the merge setting operation by clicking the mouse. In some embodiments, the user may also implement the merge setting operation by pressing a keyboard key and clicking the mouse.

In some embodiments, a UI control corresponding to the merge setting operation is separately displayed on the virtual environment picture, and the UI control is named as a merged UI control. In some other embodiments, the virtual environment picture includes a setting page for setting the game application and the setting page includes a UI control corresponding to the merge setting operation.

In step 403: the first control and the second control are merged into a third control in response to the merge setting operation.

In some examples, the third control is used for controlling the first virtual object to perform the first action (corresponding to the first control) and the second action (corresponding to the second control). Alternatively, the third control is used for controlling the first virtual object to perform a third action independent of the first action and the second action.

Merging indicates merging at least two controls into one control, and only the merged control is displayed on the virtual environment picture. The merged control has functions of the controls before the merging. After receiving the merge setting operation, the third control is displayed on the virtual environment picture, and displaying of the first control and the second control is canceled. The third control has functions corresponding to the first control and the second control. The user may control the first virtual object to perform the first action and the second action by triggering the third control.

For example, when the user clicks/taps the third control, the first virtual object performs the first action; when the user presses and holds the third control, the first virtual object performs the second action; or, when the user clicks/taps the third control, the first virtual object performs the first action; and when the user clicks/taps the third control again and the game application determines that the first virtual object is performing the first action, the first virtual object is controlled to perform the second action while performing the first action; or, when the user clicks/taps the third control, the first virtual object performs the first action; and when the user clicks/taps the third control again and the game application determines that the first virtual object has performed the first action (the first action has been performed), the first virtual object is controlled to perform the second action.

In some examples, the UI controls correspond to control identities in the application. After receiving the merge setting operation, control identities corresponding to the first control and the second control are determined, and a control identity corresponding to the third control is determined based on the control identities corresponding to the first control and the second control. In addition, during rendering of an interface, the third control is rendered according to the control identity of the third control and rendering of the first control and the second control is canceled.

It may be understood that the merge setting operation is implemented by the user once to merge at least two controls.

To sum up, in the method provided in this embodiment, through a received merge setting operation, controls of different types displayed on a virtual environment picture are merged, so that a user can, through autonomous setting, merge UI controls that are not frequently used into a same UI control or merge UI controls that need to be used together into a same UI control, and by changing the layout of the UI controls on the virtual environment picture, the process of controlling a virtual object by the user is simplified and the efficiency of human-computer interaction is improved.

In some examples, at least two controls are merged by implementing the merge setting operation on the virtual environment picture, or one control is split into at least two controls by implementing a split setting operation on the virtual environment picture. For example, in a game application, the processes of merging controls and splitting a control are described in combination with a user interface in the game application.

I. The Process of Merging Controls.

Figure 5:
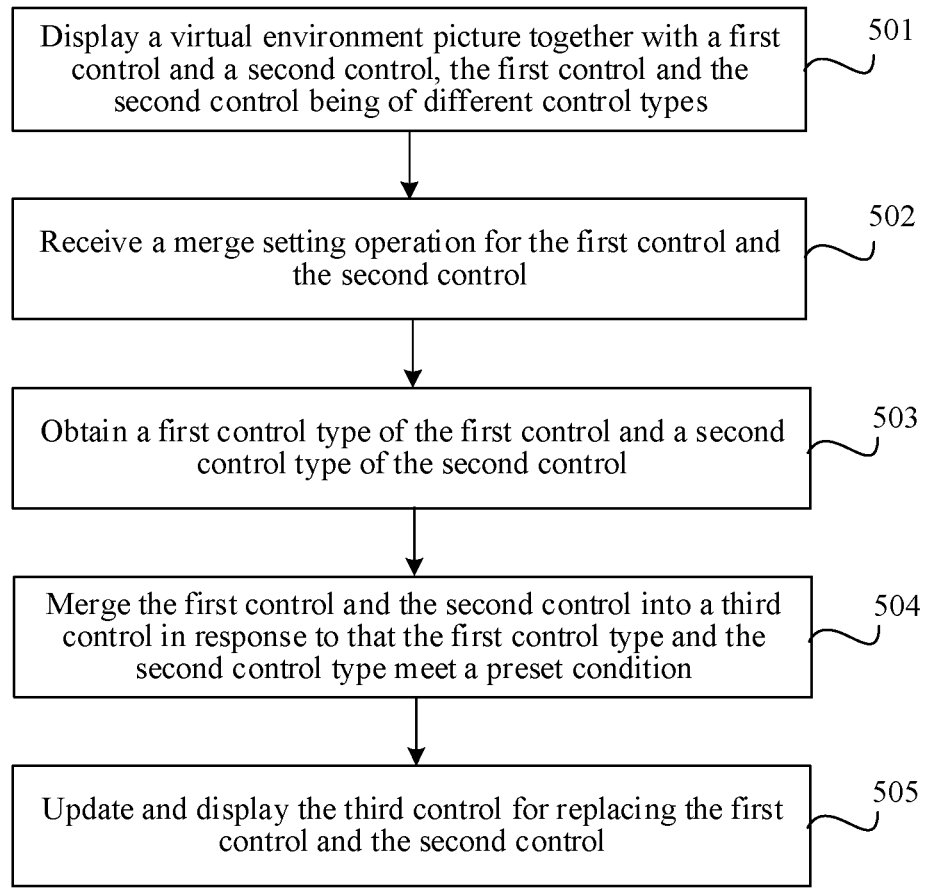
FIG. 5 is a flowchart of a display method for a virtual environment picture according to another exemplary embodiment of this disclosure.

FIG. 5 is a flowchart of a display method for a virtual environment picture according to another exemplary embodiment of this disclosure. The method can be applied to a computer device. The computer device is implemented as the first terminal 120 or the second terminal 160, or another terminal in the computer system 100 in FIG. 1. The method includes the following steps:

In step 501, a virtual environment picture is displayed, a first control and a second control are displayed on the virtual environment picture, and the first control and the second control are of different control types.

The first control is used for controlling a first virtual object to perform a first action and the second control is used for controlling the first virtual object to perform a second action.

Figure 6:
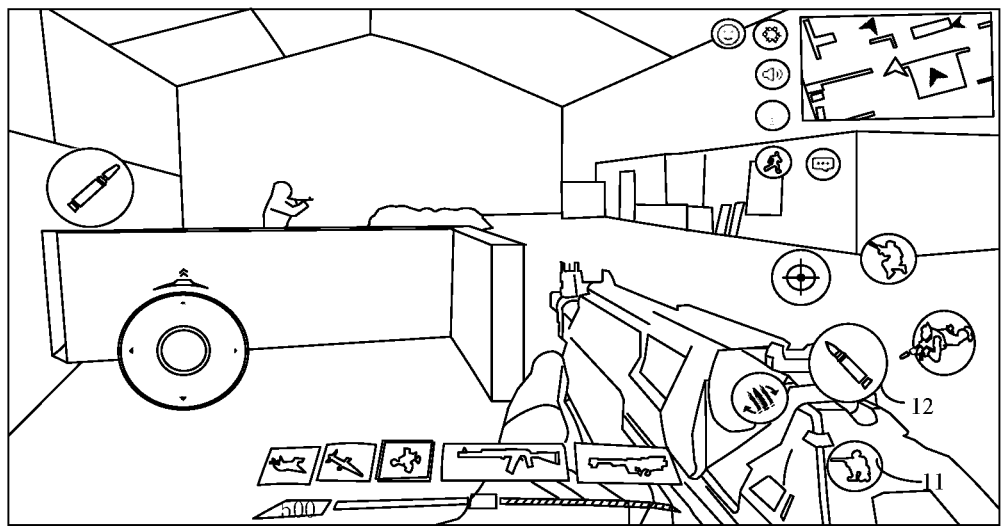
FIG. 6 is a schematic diagram of a virtual environment picture before merging controls according to an exemplary embodiment of this disclosure.

As shown in FIG. 6, a first control 11 and a second control 12 are displayed on the virtual environment picture. The first control 11 is a squatting control and the second control 12 is an aiming control. The first control 11 is a state switching type control and the second control 12 is a moving type control. The first control 11 and the second control 12 are located on a right side of the virtual environment picture.

In step 502, a merge setting operation for the first control and the second control is received.

In an example, the merge setting operation is implemented by dragging controls to be merged to a same place. For example, a user drags the first control 11 to the second control 12, or the user drags the second control 12 to the first control 11.

Figure 7:
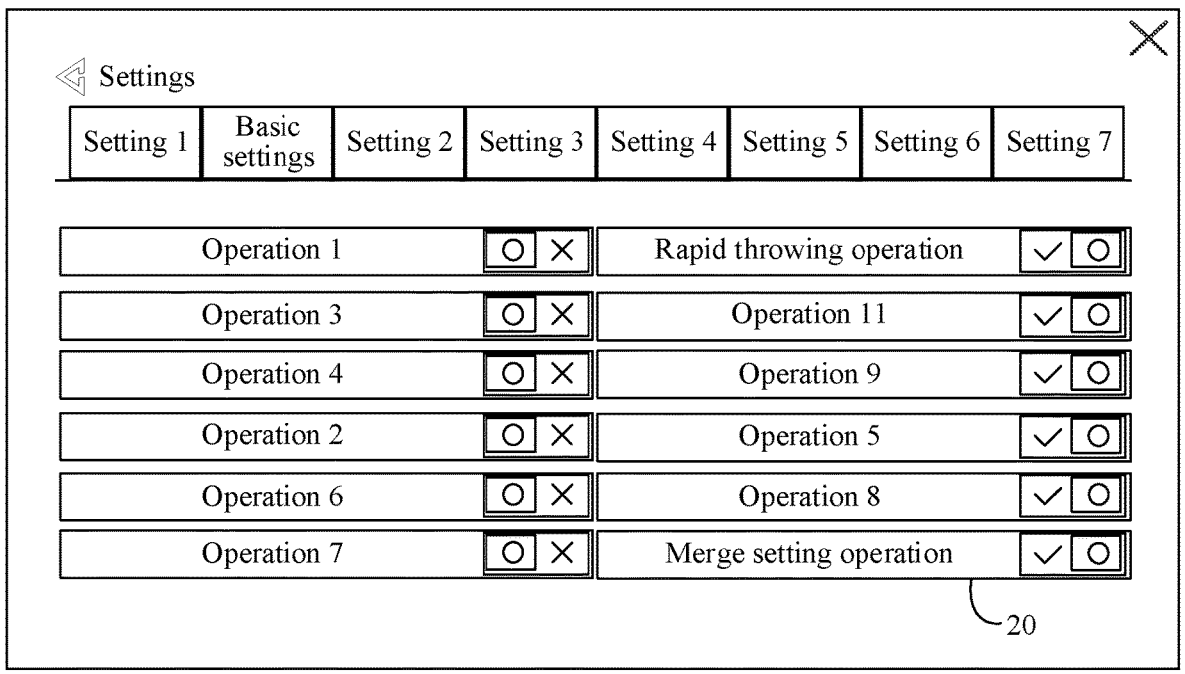
FIG. 7 is a schematic diagram of a setting interface corresponding to a merge setting operation according to an exemplary embodiment of this disclosure.

In an example, as shown in FIG. 7, the merge setting operation is an operation enabled by a user in a setting interface. When the user sets a control 20 corresponding to the merge setting operation in an open state, the first control 11 and the second control 12 can be merged in the game application.

In step 503, a first control type of the first control and a second control type of the second control are obtained.

In an example, the game application obtains control types of the first control and the second control according to the controls selected by the user during dragging.

In an example, the control types of the controls to be merged are obtained according to an operation by the user in the setting interface.

In some embodiments, the operation by the user in the setting interface is used for merging all controls of a same type, or for merging controls of preset types (for example, merging a shooting type control and a moving type control), or for merging preset controls (for example, merging a squatting control and a lying down control).

In step 504, the first control and the second control are merged into a third control in response to the first control type and the second control type meeting a preset condition.

The preset condition includes at least one of the following conditions:
 the first control type is an auxiliary type and the second control type is an aiming type; for example, the first control is a start shooting control (a control used for opening a scope of a gun virtual prop) and the second control is a shooting control;
 the first control type is an auxiliary type and the second control type is a moving type; for example, the first control is a start shooting control and the second control is a direction moving control (including a left moving control, a right moving control, a forward moving control, and a backward moving control);
 the first control type is a moving type and the second control type is an aiming type; for example, the first control is a direction moving control and the second control is a shooting control; the first control is a direction moving control and the second control is a throwing control (a control for using a throwing type virtual prop);
 the first control type is a moving type and the second control type is a state switching type; for example, the first control is a direction moving control and the second control is a squatting control;
 the first control type is a state switching type and the second control type is an auxiliary type; for example, the first control is a lying down control (a control used for controlling a virtual object to present a lying down posture) and the second control is a start shooting control; and
 the first control type is a state switching type and the second control type is an aiming type; for example, the first control is a squatting control and the second control is a shooting control.

When the type of the first control and the type of the second control are the foregoing types, the game application merges the first control and the second control.

In step 505, the third control for replacing the first control and the second control is updated and displayed.

The third control is updated and displayed on the virtual environment picture, and the updated virtual environment picture does not include the first control and the second control.

During implementation of the merge setting operation by the user, the game application identifies a user account corresponding to the merge setting operation and the game application updates the virtual environment picture corresponding to the user account according to the user account.

Figure 8:
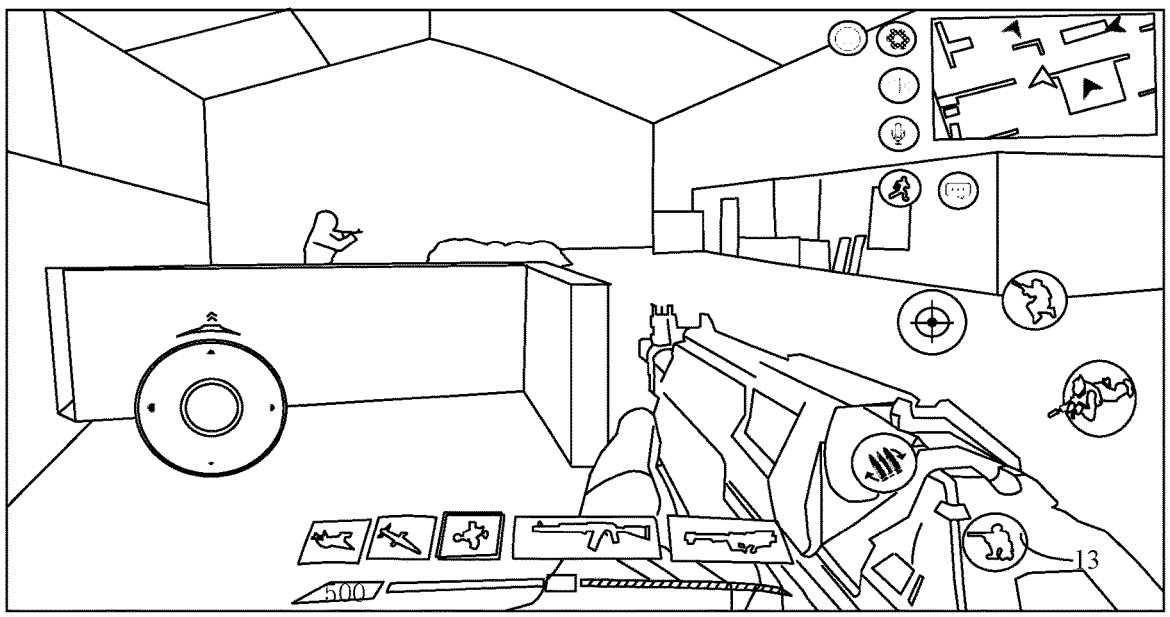
FIG. 8 is a schematic diagram of an updated virtual environment picture according to an exemplary embodiment of this disclosure.

As shown in FIG. 8, a third control 13 is displayed on the updated virtual environment picture. For example, illustration is provided by using a control identity of the first control 11 in FIG. 6 as a control identity of the currently updated third control 13 in FIG. 8. In some examples, the control identity of the second control is used as the control identity of the third control; or, a control identity is newly generated as the third control, the control identity being different from the control identity of the first control and the control identity of the second control.

Figure 9:
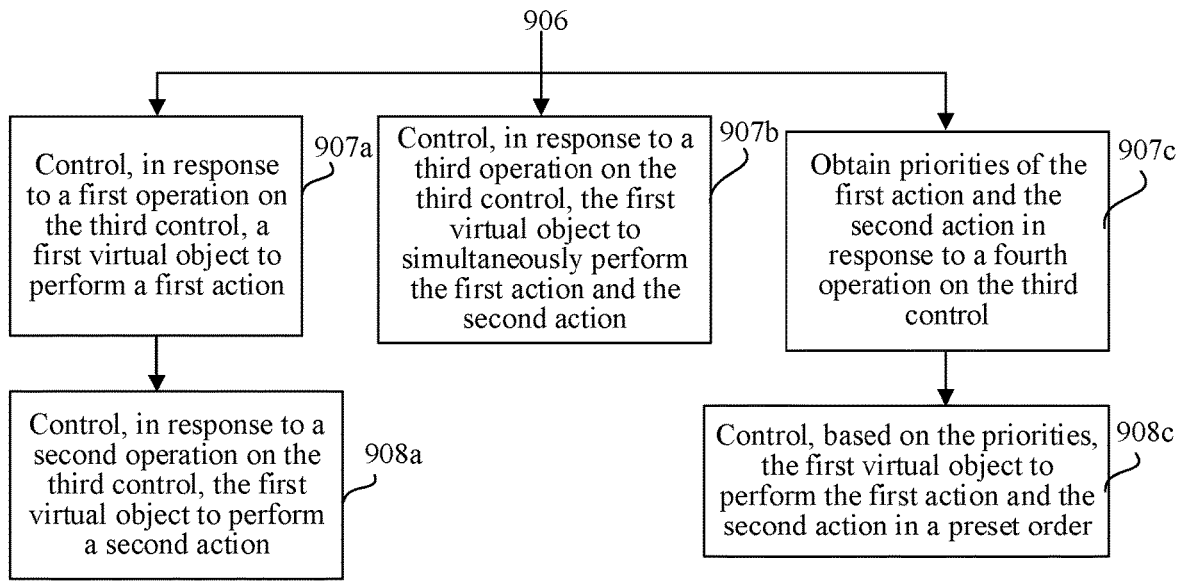
FIG. 9 is a flowchart of a display method for a virtual environment picture according to still another exemplary embodiment of this disclosure.

When the third control is used for controlling the first virtual object to perform an action, at least one of the following situations is included, as shown in FIG. 9 starting at 906:

1. The action performed by the first virtual object is correlated with an operation received on the third control.

In step 907a, in response to a first operation on the third control, a first virtual object is controlled to perform a first action.

The first operation includes at least one of a one-tap operation, a press-and-hold operation, a slide operation, a hover operation, a drag operation, a double-tap operation (including at least one of single-finger double-tap and multi-finger double-tap), and a combined operation of the above.

In an example, the first virtual object is controlled, in response to receipt of a press-and-hold operation on the third control, to perform a running action.

In step 908a, in response to a second operation on the third control, the first virtual object is controlled to perform a second action.

The second operation includes at least one of a one-tap operation, a press-and-hold operation, a slide operation, a hover operation, a drag operation, a double-tap operation (including at least one of single-finger double-tap and multi-finger double-tap), and a combined operation of the above. The first operation and the second operation are different.

In an example, the first virtual object is controlled, in response to receipt of a double-tap operation on the third control, to perform a start shooting action.

The third control generates a control instruction according to a received operation type, to control the first virtual object to perform different actions. Step 907*a* may be performed prior to step 907*b*, or step 907*b* may be performed prior to step 907*a*. In some embodiments, when the first virtual object performs an action a and the third control receives an execution operation corresponding to an action b, the first virtual object performs the action b while performing the action a. In an example, the first virtual object performs a running action in response to receipt of a double-tap operation on the third control. During running of the first virtual object, the first virtual object performs a start shooting action while running in response to receipt of a press-and-hold operation on the third control.

2. The first virtual object simultaneously performs actions corresponding to the third control.

In step 907*b*, in response to a third operation on the third control, the first virtual object is controlled to simultaneously perform the first action and the second action.

The third operation includes at least one of a one-tap operation, a press-and-hold operation, a slide operation, a hover operation, a drag operation, a double-tap operation (including at least one of single-finger double-tap and multi-finger double-tap), and a combined operation of the above.

In an example, the game application controls, in response to receipt of a drag operation by the third control, the first virtual object to simultaneously perform a running action and a bullet changing action.

3. The first virtual object performs actions according to priorities of the actions.

In step 907*c*, priorities of the first action and the second action are obtained in response to a fourth operation on the third control.

The fourth operation includes at least one of a one-tap operation, a press-and-hold operation, a slide operation, a hover operation, a drag operation, a double-tap operation (including at least one of single-finger double-tap and multi-finger double-tap), and a combined operation of the above.

In an example, the game application obtains, in response to receipt of a press-and-hold operation on the third control, a priority of an action corresponding to the third control. For example, an order of the priorities is: running action>shooting action (or throwing action)>squatting action (or lying down action)>start shooting action (bullet changing action).

In step 908*c*, based on the priorities, the first virtual object is controlled to perform the first action and the second action in a preset order.

For example, in response to a press-and-hold operation on the third control, when the priority of the first action is lower than that of the second action, the game application controls the first virtual object to perform the second action and then perform the first action.

To sum up, in the method provided in this embodiment, through a received merge setting operation, controls of different types displayed on a virtual environment picture are merged, so that a user can, through autonomous setting, merge UI controls that are not frequently used into a same UI control or merge UI controls that need to be used together into a same UI control, and by changing the layout of the UI controls on the virtual environment picture, the process of controlling a virtual object by the user is simplified and the efficiency of human-computer interaction is improved.

By determining that the first control type of the first control and the second control type of the second control meet the preset condition, the first control and the second control are merged into the third control, so that the user can merge controls of different types through the merge setting operation, thereby enabling the layout of the UI controls on the virtual environment picture to be more flexible.

By enumerating types of UI controls that meet the preset condition, the user can determine a type of UI controls that can be merged and flexibly merge the UI controls.

After the first control and the second control are merged, the virtual environment picture is updated and displayed, the merged third control is displayed on the updated virtual environment picture, and the user can more intuitively control the virtual object through the updated virtual environment picture.

When different operations are received on the third control, the virtual object is controlled to perform different actions according to different rules, so that methods for controlling the virtual object are more flexible and diverse, which helps a user to set the layout of UI controls that conform to the user's preferences or suit the user's use habits.

It may be understood that the foregoing three situations may be implemented separately or in combination.

II. The Process of Splitting a Control.

Figure 10:
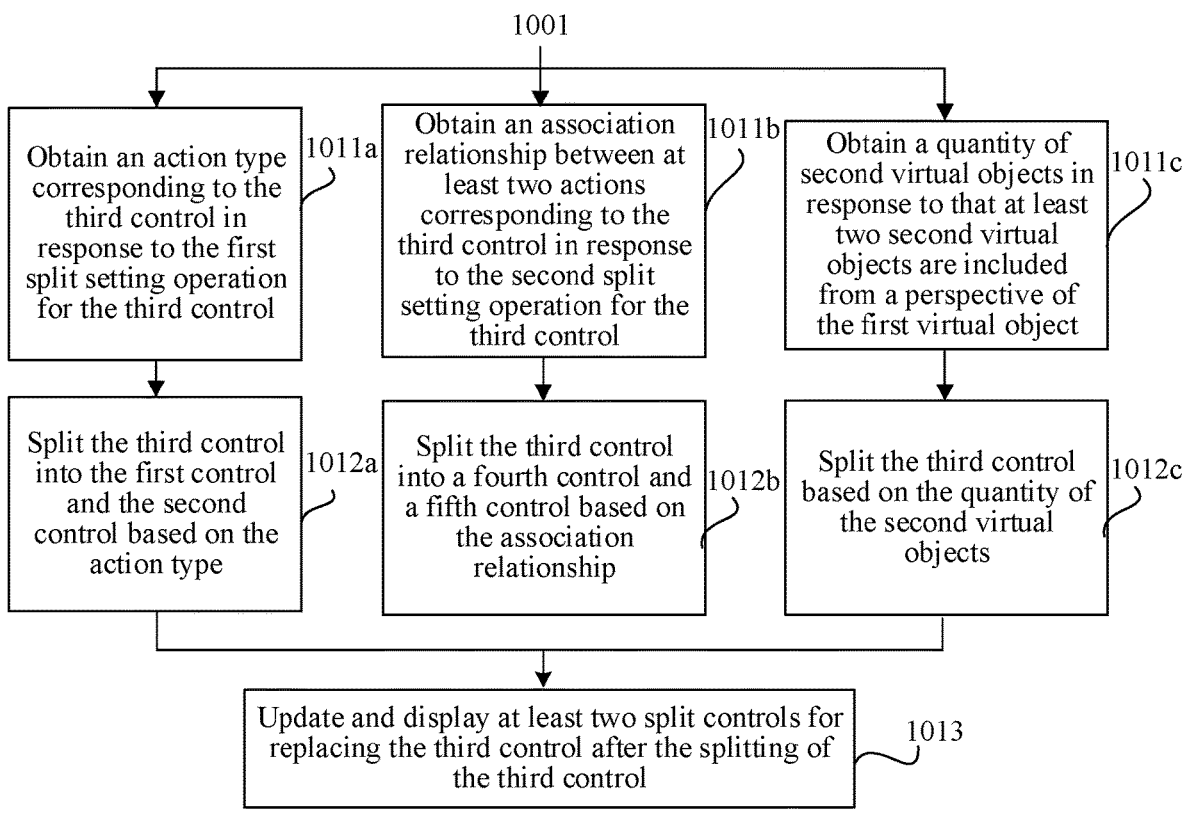
FIG. 10 is a flowchart of a display method for a virtual environment picture according to yet another exemplary embodiment of this disclosure.

The process of splitting a control includes the following three situations, as shown in FIG. 10 starting from 1001:

1. Split controls are controls of different types.

In response to a first split setting operation for the third control, the third control is split into the first control and the second control.

In step 1011*a*: an action type corresponding to the third control is obtained in response to the first split setting operation for the third control.

Figure 11:
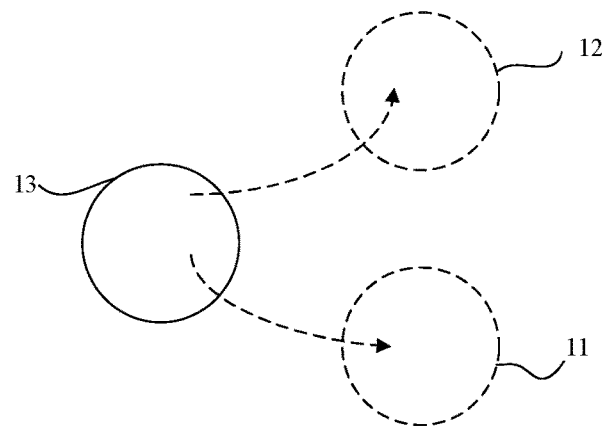
FIG. 11 is a schematic diagram of splitting a control according to an exemplary embodiment of this disclosure.

To distinguish from the merge setting operation, implementation of the split setting operation may be opposite to that of the merge setting operation. For example, the merge setting operation is a left drag operation and the split setting operation is a right drag operation. In another example, when the merge setting operation is to drag the first control to the second control to form the third control, the split setting operation is to drag, by using the third control 13 as a starting point, a control outward from the third control 13 as the first control 11 or the second control 12. An arrow indicates a drag direction, as shown in FIG. 11.

The action type corresponds to the control type of the control. For example, when the control type of a control 1 is auxiliary type, the virtual object performs an auxiliary type action after the control 1 is triggered. When the control 1 is a start shooting control, the virtual object performs a start shooting action after the start shooting control is triggered, and the action type of the start shooting action is an auxiliary type.

The third control is a merged control, and therefore the third control has functions of at least two controls. In some embodiments, in response to receipt of the split setting operation on the virtual environment picture, the game application obtains an action list corresponding to the third control, the action list being used for providing a control composition of the third control. For example, when there is a merged control in the virtual environment picture, the game application or a back-end server establishes an action list corresponding to the merged control and binds the action list with the merged control. In some examples, the action list stores a control identity of the third control and control identities corresponding to at least two controls that have a split relationship with the third control. Therefore, when the third control needs to be split, rendering of the third control is canceled in an interface rendering process and is replaced by rendering of the at least two controls corresponding to the control identity of the third control in the list.

In step 1012a, the third control is split into the first control and the second control based on the action type.

In an example, when the action list corresponding to the third control includes a squatting action and a start shooting action, the third control is split into a squatting control and a start shooting control.

2. The split controls are controls of a same type.

The third control is split into a fourth control and a fifth control in response to a second split setting operation for the third control, the fourth control and the fifth control being controls of a same type.

In step 1011b, an association relationship between at least two actions corresponding to the third control is obtained in response to the second split setting operation for the third control.

The association relationship refers to a hierarchical relationship between the actions performed by the virtual object when the third control is triggered. For example, when the actions corresponding to the third control are posture switching actions, there is a hierarchical relationship between the posture switching actions. For example, when the third control is triggered, the virtual object is controlled to perform a full squatting action (with the knees bent and the legs close to the hip) and a half squatting action (with one knee in a knelt state), to obtain a hierarchical relationship between the full squatting action and the half squatting action.

In step 1012b, the third control is split into a fourth control and a fifth control based on the association relationship.

In an example, the third control is split into a full squatting action and a half squatting action based on the association relationship. In another example, the game application splits the third control into a squatting control and a lying down control according to the association relationship. In still another example, the game application splits the third control into an action of opening a high power scope and an action of opening a low power scope according to the association relationship.

3. Perform splitting based on a quantity of virtual objects.

For example, the virtual environment picture is a picture obtained by observing a virtual environment from a perspective of a first virtual object. Usually, the first virtual object is bound with a camera model, and the virtual environment picture is obtained by photographing the virtual environment using the camera model. The third control is split based on the quantity of the virtual objects in the virtual environment picture.

For example, in response to that at least two second virtual objects are included from the perspective of the first virtual object, the third control is split based on the quantity of the second virtual objects.

In step 1011c, a quantity of second virtual objects is obtained in response to that at least two second virtual objects are included from a perspective of the first virtual object.

The first virtual object and the second virtual object are in the same virtual environment. During an activity of the first virtual object in the virtual environment, the first virtual object can see the second virtual object in the virtual environment. For example, the second virtual object and the first virtual object have a teammate relationship. In an example, when three second virtual objects are included from the perspective of the first virtual object, the game application binds the quantity of the second virtual objects with the virtual environment picture observed by the first virtual object.

In step 1012c, the third control is split based on the quantity of the second virtual objects.

For example, the third control is split into three controls based on three virtual objects. For example, the third control is split into a control 1, a control 2, and a control 3. The control 1 is used for attacking a virtual object 1, the control 2 is used for attacking a virtual object 2, and the control 3 is used for attacking a virtual object 3.

In some embodiments, in response to that the second virtual object uses a virtual prop, the third control is split based on the second virtual object and the virtual prop used by the second virtual object. For example, when the virtual prop used by the second virtual object is a shield (used for reducing injury caused to the virtual object), the third control is split into two controls, one control is used for destroying the virtual prop (the shield) used by the second virtual object and the other control is used for attacking the second virtual object. In some embodiments, duration of the control used for destroying the virtual prop is longer than that of the control used for attacking the second virtual object.

It may be understood that the foregoing three situations may be implemented separately or in combination.

In step 1013, at least two split controls are updated and displayed for replacing the third control after the splitting of the third control.

For example, the at least two split controls corresponding to the third control after splitting are updated and displayed, and the updated virtual environment picture does not include the third control.

During implementing of the split setting operation by the user, the game application identifies a user account corresponding to the split setting operation and the game application updates the virtual environment picture corresponding to the user account according to the user account.

Figure 12:
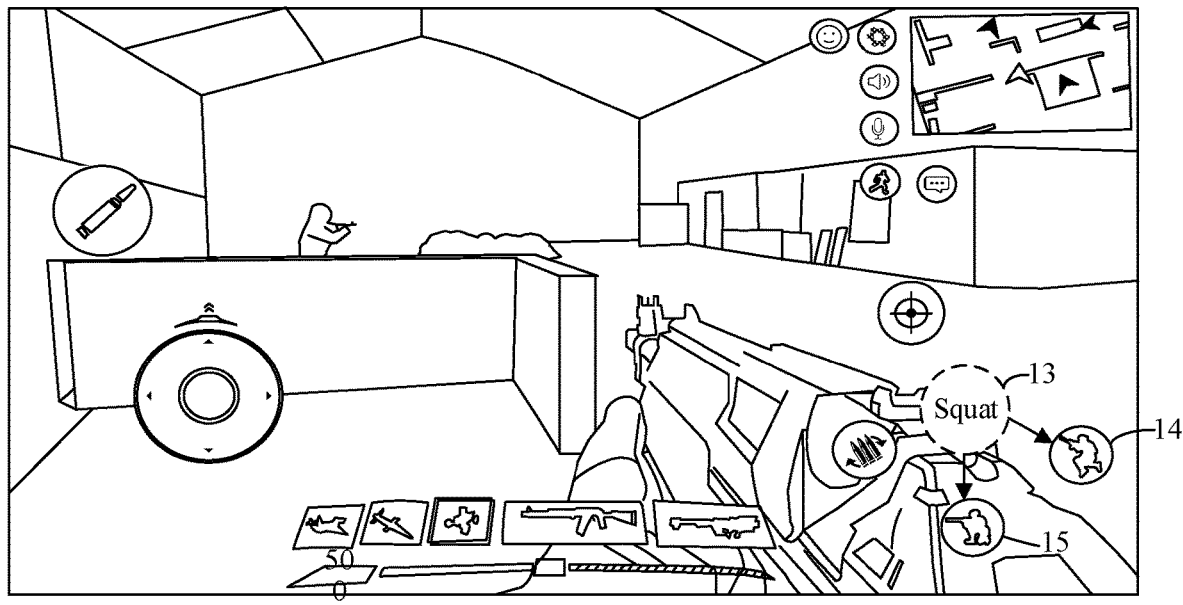
FIG. 12 is a schematic diagram of an updated virtual environment picture according to another exemplary embodiment of this disclosure.

As shown in FIG. 12, a fourth control 14 and a fifth control 15 are displayed on the updated virtual environment picture. The fourth control 14 (a full squatting control) and the fifth control 15 (a half squatting control) are obtained after splitting a squatting control 13. The updated virtual environment picture does not display the squatting control 13 (only for illustration in the figure). For example, a control identity of the fourth control 14 and a control identity of the fifth control 15 are newly generated control identities, and the two control identities are different from the control identity of the third control 13; or the control identity of the third control 13 is used as the control identity of the fourth control 14 and the control identity of the fifth control 15 is a newly generated control identity; or the control identity of the third control 13 is used as the control identity of the fifth control 15 and the control identity of the fourth control 14 is a newly generated control identity.

Figure 13:
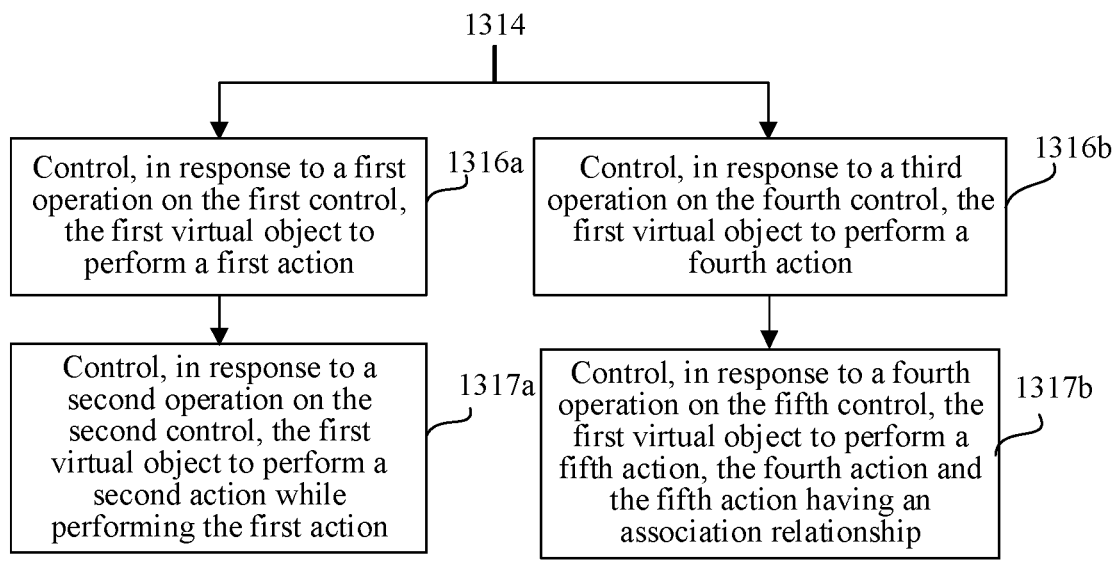
FIG. 13 is a flowchart of a display method for a virtual environment picture according to another exemplary embodiment of this disclosure.

When the controls obtained after splitting the third control are used for controlling the first virtual object to perform actions, the following two situations are included, as shown in FIG. 13 starting from 1314:

1. The first virtual object simultaneously performs at least two actions.

In step 1316a: in response to a first operation on the first control, the first virtual object is controlled to perform a first action.

The control type of the first control is different from that of the second control.

In step 1317a, in response to a second operation on the second control, the first virtual object is controlled to perform a second action while performing the first action.

For example, in a process of performing a throwing action by the first virtual object (the throwing action has not ended), in response to receipt of a press-and-hold operation on the second control, the game application controls the first virtual object to throw a virtual prop in the process of squatting. The user may control the first virtual object to hit a target accurately according to a squatting angle.

2. The first virtual object performs at least two actions in an order.

In step 1316b, in response to a third operation on the fourth control, the first virtual object is controlled to perform a fourth action.

For example, the fourth control is a lying down control, and in response to receipt of a drag operation on the lying down control, the game application controls the first virtual object to perform a lying down action.

In step 1317b, in response to a fourth operation on the fifth control, the first virtual object is controlled to perform a fifth action, the fourth action and the fifth action having an association relationship.

It may be understood that the third operation and the fourth operation are the same or different.

The association relationship refers to a specific hierarchical relationship between the actions, which are actions of a same type. For example, the fifth control is a crawling control (used for controlling the first virtual object to crawl forward), and in response to receipt of a double-tap operation on the crawling control, the game application controls the first virtual object to crawl in the virtual environment. It may be understood that step 1316b may be performed prior to step 1317b and step 1317b may be performed prior to step 1316b.

To sum up, in the method provided in this embodiment, when a split setting operation is received, the third control is split into controls for actions of a same type or of different types, so that a user can split the control according to different battle conditions in a targeted manner, thereby guaranteeing improvement in the battle efficiency of the virtual object controlled by the user while conforming to operation habits of the user.

By splitting the third control based on the corresponding action type during triggering of the third control, the split controls can implement functions corresponding to actions of different types, which is convenient for a user to split the third control according to different functions.

By splitting the third control according to the association relationship between the at least two corresponding actions during triggering of the third control, the split controls can implement different hierarchies of actions of a same type, which is convenient for a user to perform actions at different hierarchies according to different battle situations, and is beneficial to improving the battle efficiency of a virtual object.

By splitting the third control according to the quantity of second virtual objects from the perspective of the first virtual object, the split controls can attack different virtual objects, which is beneficial to improving the battle efficiency of the virtual object.

After the third control is split, the virtual environment picture is updated and displayed, split controls are displayed on the updated virtual environment picture, and the user can more intuitively control the virtual object through the updated virtual environment picture.

When different operations are received on the split controls, the virtual object may be controlled to perform different actions, so that methods for controlling the virtual object are more flexible and diverse, which helps a user to set the layout of UI controls that conform to the user's preferences or suit the user's use habits.

It may be understood that the foregoing two situations can be implemented separately or in combination.

Figure 14:
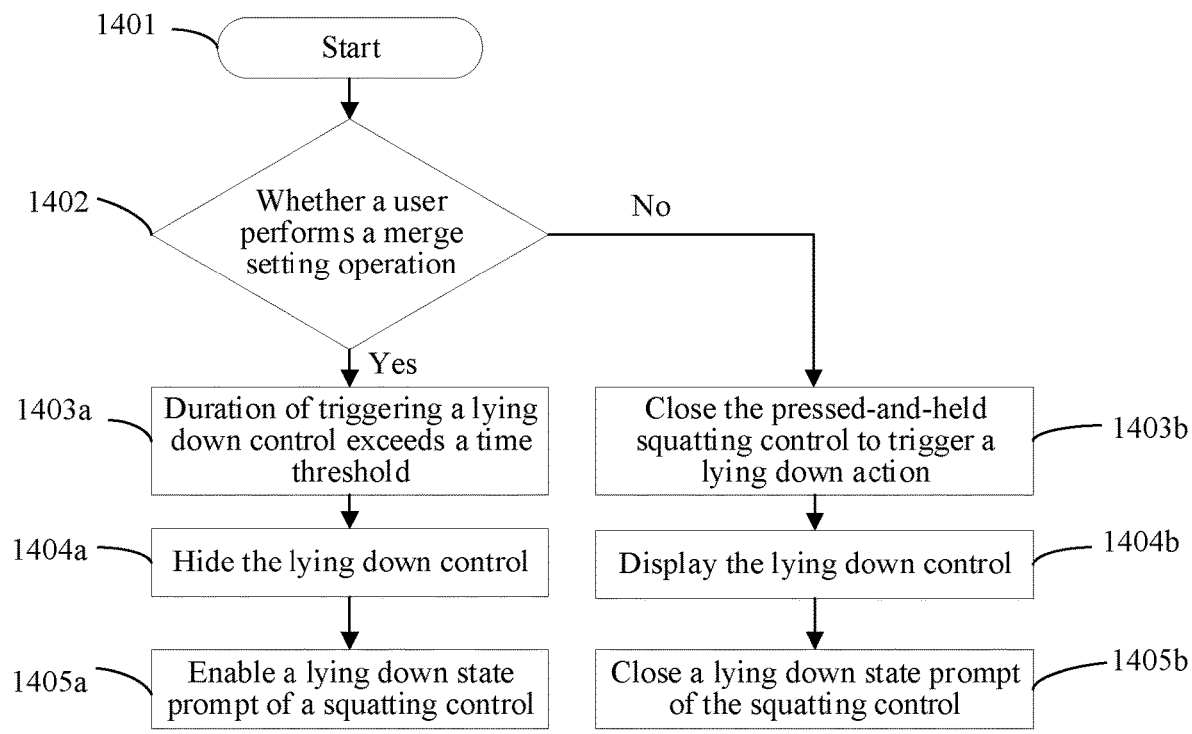
FIG. 14 is a flowchart of a method for a merge setting operation according to an exemplary embodiment of this disclosure.

In an example, merging of controls includes a merging process of the following steps, as shown in FIG. 14:

In step 1401, the merging process starts.

In step 1402, whether a user performs a merge setting operation is determined.

When the user performs the merge setting operation, step 1403a is performed. When the user does not perform the merge setting operation, step 1403b is performed.

In step 1403a, duration of triggering a lying down control is detected to exceed a time threshold.

When the user performs the merge setting operation, a game application merges a first control and a second control, to obtain a third control. In some examples, the first control is a squatting control and the second control is a lying down control. A control identity of the first control (the squatting control) is used as the control identity of the third control and a control identity of the second control (the lying down control) is hidden.

In an example, the time threshold is 0.5 s, and a trigger operation received on the third control exceeds 0.5 s.

In step 1404a, the lying down control is hidden.

In this case, an execution condition for the lying down action is met, and the original second control (the lying down control) is not displayed on the virtual environment picture.

In step 1405a, a lying down state prompt of a squatting control is enabled.

In this case, the merged third control has two functions supporting a squatting action and a lying down action. For example, the user is prompted in a form of a high-lightened squatting control. In this case, the squatting control is used for controlling a first virtual object to perform a squatting action. When the squatting control is not in a highlighted state, the squatting control is used for controlling the first virtual object to perform the squatting action.

In step 1403b, the pressed-and-held squatting control to trigger a lying down action is closed.

When the user does not perform the merge setting operation, the first control (the squatting control) and the second control (the lying down control) are not merged in this case.

In step 1404b, the lying down control is displayed.

The lying down control is separately displayed on the virtual environment picture.

In step 1405b, a lying down state prompt of the squatting control is closed.

The squatting control is used for controlling a first virtual object to perform a squatting action and the lying down control is used for controlling the first virtual object to perform a lying down action. Functions of the two controls are not merged.

In a round of a game, step 1402 to step 1405a (step 1405b) can be performed circularly until the end of the round of the game.

Figure 15:
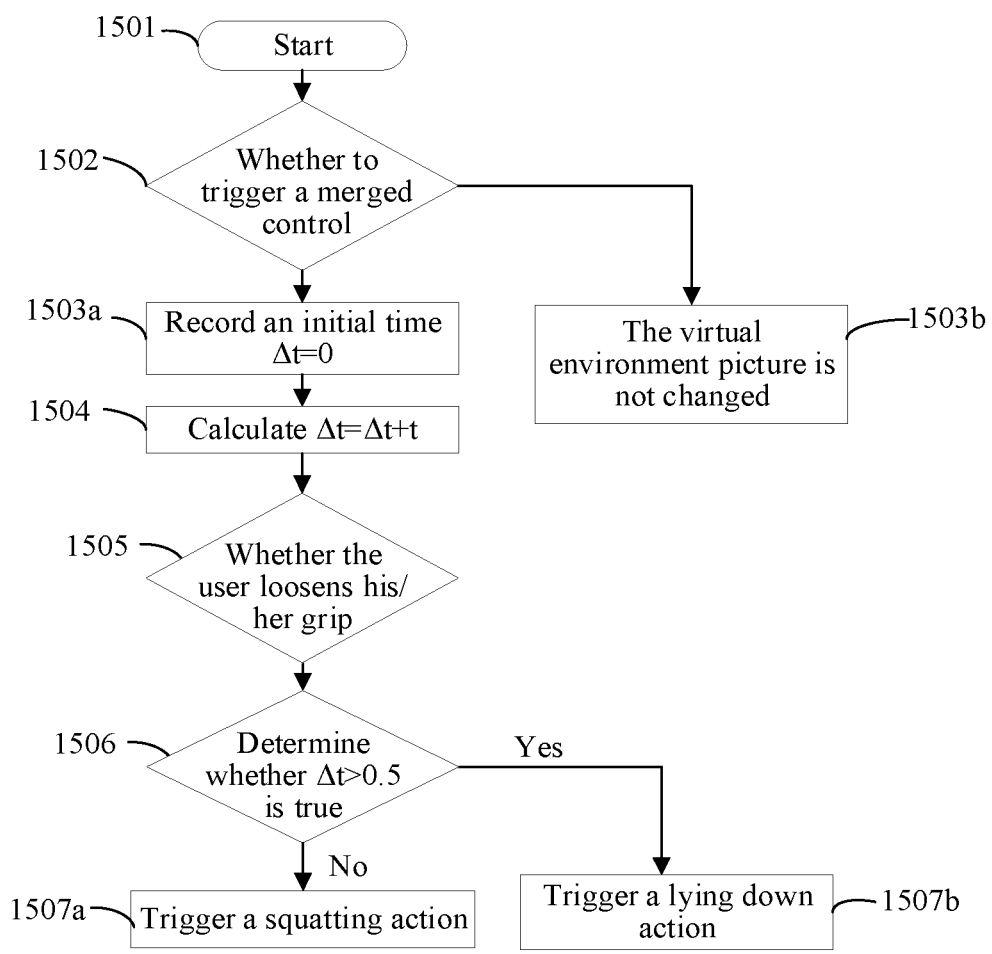
FIG. 15 is a flowchart of a method for determining a status of a virtual object according to an exemplary embodiment of this disclosure.

In an example, after merging the controls, the game application determines whether the operation by the user is to control the first virtual object to perform a lying down action or a squatting action, including a process of the following steps, as shown in FIG. 15:

In step 1501, the process starts.

In step 1502, whether to trigger a merged control is determined.

After the user sets the merge operation, the game application merges the first control and the second control, to obtain the third control. When the user triggers the third control, step 1503*a* is performed. When the user does not trigger the third control, step 1503*b* is performed.

In step 1503*a*, an initial time Δt=0 is recorded.

The third control is triggered, and the game application records the initial time and duration T corresponding to the triggering process.

In step 1503*b*, the virtual environment picture is not changed.

The third control is not triggered, and the virtual environment picture does not change.

In step 1504: Δt=Δt+t is calculated.

Total duration of the initial time Δt of the triggering and the trigger duration T is calculated.

In step 1505, whether the user loosens his/her grip is determined.

The game application determines whether the user loosens his/her grip, and when the user loosens his/her grip, step 1506 is performed. When the user does not loosens his/her grip, step 1504 is returned (to continuously calculate the duration).

In step 1506, whether Δt>0.5 is true is determined.

The game application determines whether the duration for which the third control is triggered is greater than a time threshold, and when the duration for which the third control is triggered is greater than the time threshold, step 1507*a* is performed. When the duration for which the third control is triggered is not greater than the time threshold, step 1507*b* is performed.

In step 1507*a*, a squatting action is triggered.

When the duration for which the third control is triggered is not greater than the time threshold, the game application controls the first virtual object to perform the squatting action.

In step 1507*b*, a lying down action is triggered.

When the duration for which the third control is triggered is greater than the time threshold, the game application controls the first virtual object to perform the lying down action.

It is be understood that each time the user modifies an operation option, current option settings are recorded in an internal memory. A primary key value is SettingKeys.HideProneBtn, and value content is status (true or false) of the current option. This part of information is stored in local data of a computer device corresponding to the user. When the user logs in the game again or starts a new game using the computer device, the value of this option is obtained from the local data to maintain consistency of operation settings for the user.

In a round of a game, step 1502 to step 1507*a* (step 1507*b*) can be performed circularly until the end of the round of the game.

The foregoing method is described based on a game application scenario in the foregoing embodiments, and the following is an exemplary description of the foregoing method based on a military simulation application scenario.

The simulation technology is a model technology in which a system behavior or process is reflected by using software and hardware through an experiment of simulating a real world.

A military simulation program is a program specially constructed for military application by using the simulation technology, which performs quantitative analysis on battle elements such as sea, air, and land, weapon equipment performance, battle actions, and the like, to accurately simulate a battlefield environment, and present a battlefield situation, thereby implementing battle system evaluation and decision aids.

In an example, soldiers set up a virtual battlefield on a terminal on which the military simulation program is located, and fight in teams. The soldier controls a virtual object in the battlefield virtual environment to perform at least one of actions of standing, squatting, sitting, lying supine, lying prostrate, lying on the side, walking, running, climbing, driving, shooting, throwing, attacking, being injured, investigating, close fighting, and the like in the battlefield virtual environment. The battlefield virtual environment includes at least one of natural forms of flat land, mountains, plateaus, basins, deserts, rivers, lakes, oceans, and vegetation, as well as site forms of buildings, vehicles, ruins, training ground, and the like. Virtual objects include a virtual person, a virtual animal, a cartoon person, and the like. Each virtual object has a shape and size in a 3D virtual environment, and occupies some space in the 3D virtual environment.

Based on the above, in an example, a soldier A controls a virtual object a, a soldier B controls a virtual object b, a soldier C controls a virtual object c, the soldier A and the soldier B are soldiers in a same team, and the soldier C is not in the same team as the soldier A and the soldier B. When the virtual object a and the virtual object b are seen from the perspective of the virtual object c, the soldier C sets a split operation in a military simulation program to split a shooting control into two shooting controls, namely, a shooting control 1 and a shooting control 2. The shooting control 1 is used for attacking the virtual object 1 and the shooting control 2 is used for attacking the virtual object 2. When the shooting control 1 and the shooting control 2 are triggered, duration of the shooting control 1 is longer than that of the shooting control 2 (the virtual object 1 wears a protective virtual prop, and therefore a longer time is needed for attacking).

To sum up, in this embodiment, the display method for a virtual environment picture is applied to the military simulation program, and a soldier merges controls or splits a control in combination with a tactical layout, so that the layout of the controls suits the soldier's use habits, thereby improving the efficiency of human-computer interaction for the soldier, implementing a more realistic simulation on an actual battle site, and enabling the soldier to get better training.

The following is an apparatus embodiment of this disclosure. For details not described in detail in the apparatus embodiment, reference may be made to corresponding record in the foregoing method embodiments. Details are not described herein again.

Figure 16:
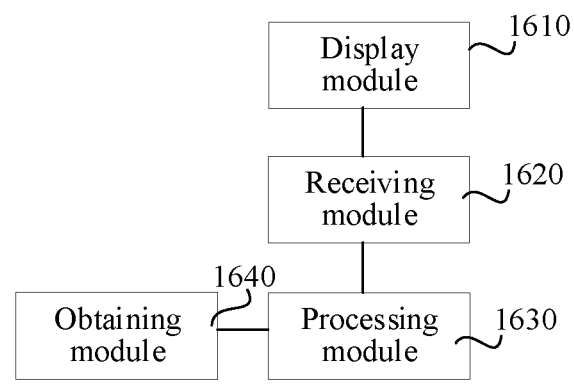
FIG. 16 is a block diagram of a display apparatus for a virtual environment picture according to an exemplary embodiment of this disclosure.

FIG. 16 is a schematic structural diagram of a display apparatus for a virtual environment picture according to an exemplary embodiment of this disclosure. The apparatus can be implemented as all or part of a terminal through software, hardware, or a combination of both. The apparatus includes a display module 1610, a receiving module 1620, and a processing module 1630. One or more modules, submodules, and/or units of the apparatus can be implemented by processing circuitry, software, or a combination thereof, for example.

The display module 1610 is configured to display a virtual environment picture together with a first control and a second control, the first control and the second control being of different control types. The receiving module 1620 is configured to receive a merge setting operation for the first control and the second control.

The processing module 1630 is configured to merge the first control and the second control into a third control in response to the merge setting operation.

In an embodiment, the apparatus includes an obtaining module 1640.

The obtaining module 1640 is configured to obtain a first control type of the first control and a second control type of the second control in response to the merge setting operation; and the processing module 1630 is configured to merge the first control and the second control into a third control in response to that the first control type and the second control type meet a preset condition.

In an embodiment, the preset condition includes at least one of the following conditions:
the first control type is an auxiliary type and the second control type is an aiming type;
the first control type is an auxiliary type and the second control type is a moving type;
the first control type is a moving type and the second control type is an aiming type;
the first control type is a moving type and the second control type is a state switching type;
the first control type is a state switching type and the second control type is an auxiliary type; and
the first control type is a state switching type and the second control type is an aiming type.

In an embodiment, the display module 1610 is configured to update and display the third control for replacing the first control and the second control.

In an embodiment, the first control is used for controlling a first virtual object to perform a first action;
the second control is used for controlling the first virtual object to perform a second action; and
the third control is used for controlling the first virtual object to perform the first action and the second action.

In an embodiment, the processing module 1630 is configured to control, in response to a first operation for the third control, the first virtual object to perform the first action; control, in response to a second operation on the third control, the first virtual object to perform the second action; or, control, in response to a third operation on the third control, the first virtual object to simultaneously perform the first action and the second action; or, obtain priorities of the first action and the second action in response to a fourth operation on the third control; and control, according to the priorities, the first virtual object to perform the first action and the second action in a preset order.

In an embodiment, the processing module 1630 is configured to split the third control into the first control and the second control in response to a first split setting operation for the third control; or, split the third control into a fourth control and a fifth control in response to a second split setting operation for the third control, the fourth control and the fifth control being controls of a same type.

In an embodiment, the obtaining module 1640 is configured to obtain an action type corresponding to the third control in response to the first split setting operation for the third control; and the processing module 1630 is configured to split the third control into the first control and the second control based on the action type.

In an embodiment, the obtaining module 1640 is configured to obtain an association relationship between at least two actions corresponding to the third control in response to the second split setting operation for the third control; and the processing module 1630 is configured to split the third control into a fourth control and a fifth control based on the association relationship.

In an embodiment, the virtual environment picture is a picture obtained by observing a virtual environment from a perspective of a first virtual object;

the obtaining module 1640 is configured to obtain a quantity of second virtual objects in response to that at least two second virtual objects are included from the perspective of the first virtual object; and the processing module 1630 is configured to split the third control based on the quantity of the second virtual objects.

In an embodiment, the display module 1610 is configured to update and display at least two split controls for replacing the third control after the splitting of the third control.

In an embodiment, the processing module 1630 is configured to control, in response to a first operation for the first control, the first virtual object to perform the first action; control, in response to a second operation on the second control, the first virtual object to perform a second action while performing the first action; or, control, in response to a third operation on the fourth control, the first virtual object to perform a fourth action; and control, in response to a fourth operation on the fifth control, the first virtual object to perform a fifth action, the fourth action and the fifth action having an association relationship.

To sum up, through the apparatus provided in this embodiment, through a received merge setting operation, controls of different types displayed on a virtual environment picture are merged, so that a user can, through autonomous setting, merge UI controls that are not frequently used into a same UI control or merge UI controls that need to be used together into a same UI control, and by changing the layout of the UI controls on the virtual environment picture, the process of controlling a virtual object by the user is simplified and the efficiency of human-computer interaction is improved.

By determining whether the first control type of the first control and the second control type of the second control meet the preset condition, the first control and the second control are merged into the third control, so that the user can merge controls of different types through the merge setting operation, thereby enabling the layout of the UI controls on the virtual environment picture to be more flexible.

By enumerating types of UI controls that meet the preset condition, the user can determine a type of UI controls that can be merged and flexibly merge the UI controls.

After the first control and the second control are merged, the virtual environment picture is updated and displayed, the merged third control is displayed on the updated virtual environment picture, and the user can more intuitively control the virtual object through the updated virtual environment picture.

When different operations are received on the third control, the virtual object is controlled to perform different actions according to different rules, so that methods for controlling the virtual object are more flexible and diverse, which helps a user to set the layout of UI controls that conform to the user's preferences or suit the user's use habits.

When a split setting operation is received, the third control is split into controls for actions of a same type or of different types, so that a user can split the control according to different battle conditions in a targeted manner, thereby guaranteeing improvement in the battle efficiency of the virtual object controlled by the user while conforming to operation habits of the user.

By splitting the third control according to the corresponding action type during triggering of the third control, the split controls can implement functions corresponding to actions of different types, which is convenient for a user to split the third control according to different functions.

By splitting the third control according to the association relationship between the at least two corresponding actions during triggering of the third control, the split controls can implement different hierarchies of actions of a same type, which is convenient for a user to perform actions at different hierarchies according to different battle situations, and is beneficial to improving the battle efficiency of a virtual object.

By splitting the third control according to the quantity of second virtual objects from the perspective of the first virtual object, the split controls can attack different virtual objects, which is beneficial to improving the battle efficiency of the virtual object.

After the third control is split, the virtual environment picture is updated and displayed, split controls are displayed on the updated virtual environment picture, and the user can more intuitively control the virtual object through the updated virtual environment picture.

When different operations are received on the split controls, the virtual object may be controlled to perform different actions, so that methods for controlling the virtual object are more flexible and diverse, which helps a user to set the layout of UI controls that conform to the user's preferences or suit the user's use habits.

It is to be understood that: through the display apparatus for a virtual environment picture provided by the embodiments, only the division of the above functional modules is given as an example for the convenience and conciseness of description. In practical application, the above functional distribution can be completed by different functional modules according to needs, that is, the internal structure of the apparatus is divided into different functional modules to complete all or part of the functions described above. In addition, the display apparatus for a virtual environment picture provided in the embodiments is of the same concept with the embodiment of the display method for a virtual environment picture, and the specific implementation process thereof can be referred to in the method embodiment, which will not be repeated herein.

Figure 17:
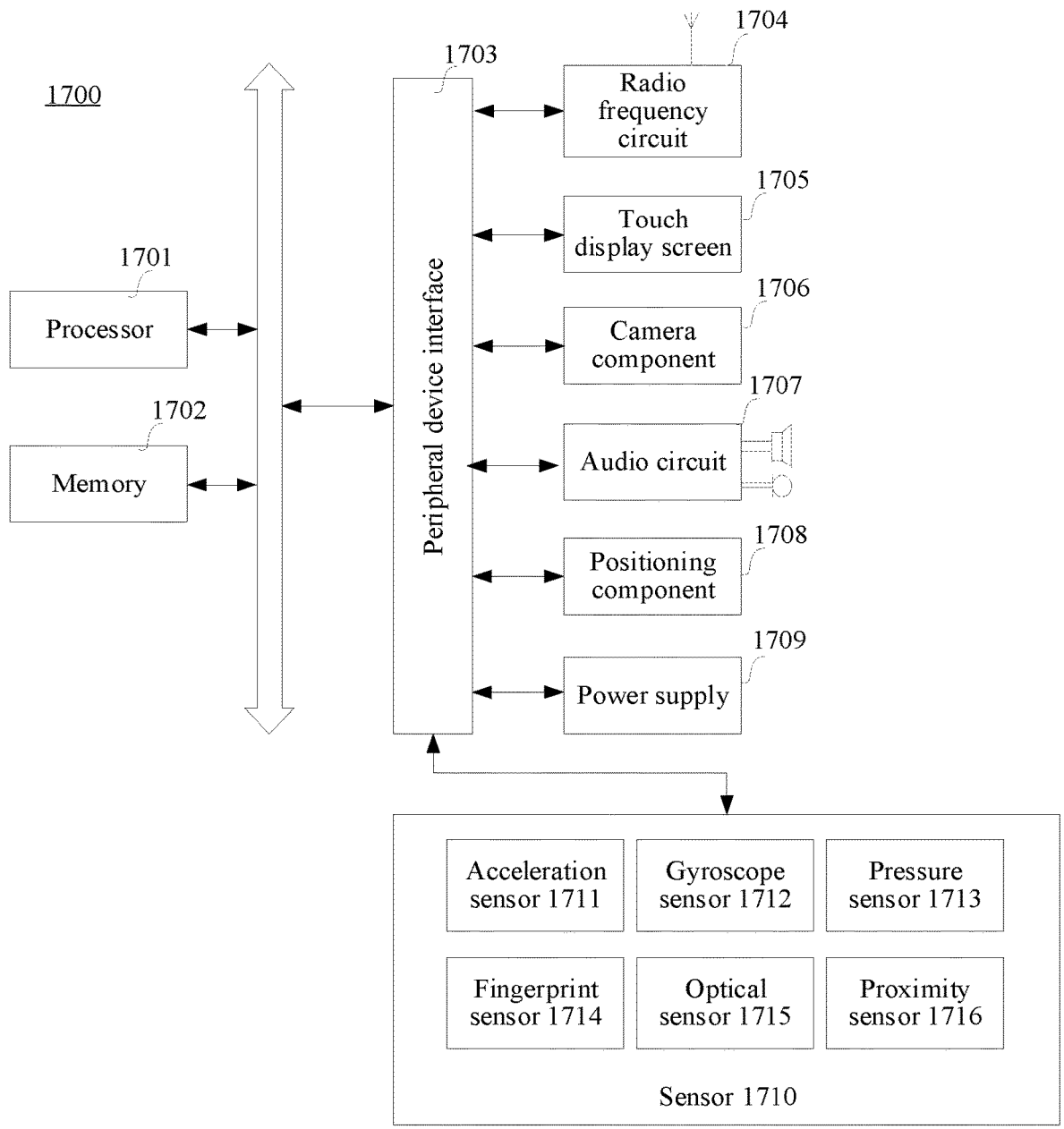
FIG. 17 is a schematic diagram of an apparatus structure of a computer device according to an exemplary embodiment of this disclosure.

FIG. 17 shows a structural block diagram of a computer device 1700 according to an exemplary embodiment of this disclosure. The computer device 1700 may be a portable mobile terminal, for example, a smartphone, a tablet computer, a moving picture experts group audio layer III (MP3) player, or a moving picture experts group audio layer IV (MP4) player. The computer device 1700 may be further referred to as other names such as user equipment and a portable terminal.

Generally, the computer device 1700 includes a processor 1701 and a memory 1702.

The processor 1701 may include one or more processing cores. For example, the processor may be a 4-core processor or an 8-core processor.

The memory 1702 may include one or more computer-readable storage media. The computer-readable storage medium may be tangible and non-transient. The memory 1702 may further include a high-speed random access memory (RAM), and a non-volatile memory such as one or more magnetic disk storage devices and a flash storage device. In some embodiments, a non-transitory computer-readable storage medium in the memory 1702 is configured to store at least one instruction, which is to be executed by the processor 1701 to perform the display method for a virtual environment picture provided in the embodiments of this disclosure.

In some embodiments, the computer device 1700 further includes a peripheral device interface 1703 and at least one peripheral device. Specifically, the peripheral device includes: at least one of a radio frequency (RF) circuit 1704, a touch display screen 1705, a camera component 1706, an audio circuit 1707, a positioning component 1708, and a power supply 1709.

The peripheral device interface 1703 may be configured to connect at least one peripheral device related to input/output (I/O) to the processor 1701 and the memory 1702.

The RF circuit 1704 is configured to receive and transmit an RF signal, also referred to as an electromagnetic signal. The RF circuit 1704 communicates with a communication network and another communication device through the electromagnetic signal. The RF circuit 1704 converts an electrical signal into an electromagnetic signal for transmission, or converts a received electromagnetic signal into an electrical signal.

The touch display screen 1705 is configured to display a user interface (UI).

The camera component 1706 is configured to acquire images or videos. The audio circuit 1707 is configured to provide an audio interface between a user and the computer device 1700. The audio circuit 1707 may include a microphone and a speaker.

The positioning component 1708 is configured to determine a current geographic location of the computer device 1700 through positioning, to implement navigation or a location based service (LBS).

The power supply 1709 is configured to supply power to components in the computer device 1700.

In some embodiments, the computer device 1700 may further include one or more sensors 1710. The one or more sensors 1710 include, but are not limited to, an acceleration sensor 1711, a gyroscope sensor 1712, a pressure sensor 1713, a fingerprint sensor 1714, an optical sensor 1715, and a proximity sensor 1716.

A person skilled in the art may understand that the structure shown in FIG. 17 does not constitute any limitation on the computer device 1700, and the computer device may include more components or fewer components than those shown in the figure, or some components may be combined, or a different component deployment may be used.

An embodiment of this disclosure also provides a computer device, including: a processor and a memory, the memory storing at least one instruction, at least one program, a code set, or an instruction set, the at least one instruction, the at least one program, the code set, or the instruction set being loaded and executed by the processor, to perform the display method for a virtual environment picture according to the foregoing method embodiments.

An embodiment of this disclosure also provides a computer-readable storage medium, storing at least one instruction, at least one program, a code set, or an instruction set, the at least one instruction, the at least one program, the code set, or the instruction set being loaded and executed by a processor, to perform the display method for a virtual environment picture according to the foregoing method embodiments.

An embodiment of this disclosure further provides a computer program product or a computer program. The computer program product or the computer program includes computer instructions, and the computer instructions are stored in a computer-readable storage medium. A processor of a computer device reads the computer instructions from the computer-readable storage medium, and the processor executes the computer instructions, so that the computer device performs the display method for a virtual environment picture according to the foregoing aspects.

It is to be understood that "plurality of" mentioned in this specification means two or more. "And/or" describes an association relationship for associated objects and represents that three relationships may exist. For example, A and/or B may represent the following three cases: only A exists, both A and B exist, and only B exists. The character "/" in this specification generally indicates an "or" relationship between the associated objects.

A person of ordinary skill in the art may understand that all or some of the steps of the foregoing embodiments may be implemented by using hardware, or may be implemented by a program instructing relevant hardware. The program may be stored in a computer-readable storage medium. The storage medium may be a ROM, a magnetic disk, an optical disc, or the like.

The foregoing descriptions are some embodiments of this disclosure, but are not intended to limit this disclosure. Any modification, equivalent replacement, or improvement made within the spirit and principle of this disclosure shall fall within the protection scope of this disclosure.

What is claimed is:

1. A method for a control interface in a virtual environment, comprising:
providing a graphical user interface (GUI) of the virtual environment, the GUI comprising a first graphical element and a second graphical element, the first graphical element being associated with a first control for a first virtual object and the second graphical element being associated with a second control for the first virtual object, wherein the first graphical element is used for controlling the first virtual object to perform a first action and the second graphical element is used for controlling the first virtual object to perform a second action;
receiving a merge setting operation for the first graphical element and the second graphical element;
merging the first control and the second control into a third graphical element in response to the merge setting operation; and
updating the GUI with the third graphical element that replaces the first graphical element and the second graphical element, wherein the third graphical element is used for controlling the first virtual object to perform at least one of the first action or the second action.

2. The method according to claim 1, wherein the merging the first control and the second control into the third graphical element comprises:
obtaining a first control type of the first control and a second control type of the second control in response to the merge setting operation; and
merging the first control and the second control into the third graphical element in response to that the first control type and the second control type meet a preset condition.

3. The method according to claim 2, wherein the preset condition comprises at least one of:
the first control type is an auxiliary type and the second control type is an aiming type;
the first control type is the auxiliary type and the second control type is a moving type;
the first control type is the moving type and the second control type is the aiming type;
the first control type is the moving type and the second control type is a state switching type;
the first control type is the state switching type and the second control type is the auxiliary type; and
the first control type is the state switching type and the second control type is the aiming type.

4. The method according to claim 1, wherein the method further comprises one of:
controlling, in response to a first operation on the third graphical element, the first virtual object to perform the first action; and controlling, in response to a second operation on the third graphical element, the first virtual object to perform the second action;
controlling, in response to a third operation on the third graphical element, the first virtual object to simultaneously perform the first action and the second action; or
obtaining priorities of the first action and the second action in response to a fourth operation on the third graphical element; and controlling, according to the priorities, the first virtual object to perform the first action and the second action in a preset order.

5. The method according to claim 1, wherein the method further comprises:
obtaining different control types of merged controls associated the third graphical element in response to a split setting operation on the third graphical element in the GUI;
splitting the merged controls associated with the third graphical element into at least the first control and the second control based on the different control types; and
updating the GUI with the first graphical element associated with the first control and the second graphical element associated with the second control.

6. The method according to claim 1, further comprising:
obtaining a relationship of merged controls associated with the third graphical element in response to a split setting operation on the third graphical element in the GUI, the merged controls being of a same control type;
splitting the merged controls into the first control and the second control based on the relationship; and
updating the GUI with the first graphical element associated with the first control and the second graphical element associated with the second control.

7. The method according to claim 1, wherein a picture of the virtual environment is obtained from a perspective of the first virtual object, and the method further comprises:
splitting, in response to the picture including at least two second virtual objects, merged controls associated with a fourth graphical element for controlling the at least two second virtual objects into individual controls for the at least two second virtual objects based on a quantity of the at least two second virtual objects; and
updating the GUI with separate graphical elements respectively associated with the individual controls for the at least two second virtual objects.

8. An apparatus, comprising processing circuitry configured to:
provide a graphical user interface (GUI) of a virtual environment, the GUI comprising a first graphical element and a second graphical element, the first graphical element being associated with a first control for a first virtual object and the second graphical element being associated with a second control for the first virtual object, wherein the first graphical element is used for controlling the first virtual object to perform a first action and the second graphical element is used for controlling the first virtual object to perform a second action;
receive a merge setting operation for the first graphical element and the second graphical element;

merge the first control and the second control into a third graphical element in response to the merge setting operation; and update the GUI with the third graphical element that replaces the first graphical element and the second graphical element, wherein the third graphical element is used for controlling the first virtual object to perform at least one of the first action or the second action.

9. The apparatus according to claim 8, wherein the processing circuitry is configured to:

obtain a first control type of the first control and a second control type of the second control in response to the merge setting operation; and merge the first control and the second control with the third graphical element in response to that the first control type and the second control type meet a preset condition.

10. The apparatus according to claim 9, wherein the preset condition comprises at least one of:

the first control type is an auxiliary type and the second control type is an aiming type;

the first control type is the auxiliary type and the second control type is a moving type;

the first control type is the moving type and the second control type is the aiming type;

the first control type is the moving type and the second control type is a state switching type;

the first control type is the state switching type and the second control type is the auxiliary type; and the first control type is the state switching type and the second control type is the aiming type.

11. The apparatus according to claim 8, wherein the processing circuitry is configured to:

control, in response to a first operation on the third graphical element, the first virtual object to perform the first action; and control, in response to a second operation on the third graphical element, the first virtual object to perform the second action;

control, in response to a third operation on the third graphical element, the first virtual object to simultaneously perform the first action and the second action; or obtain priorities of the first action and the second action in response to a fourth operation on the third graphical element; and control, according to the priorities, the first virtual object to perform the first action and the second action in a preset order.

12. The apparatus according to claim 8, wherein the processing circuitry is configured to:

obtain different control types of merged controls associated the third graphical element in response to a split setting operation on the third graphical element in the GUI;

split the merged controls associated with the third graphical element into at least the first control and the second control based on the different control types; and update the GUI with the first graphical element associated with the first control and the second graphical element associated with the second control.

13. The apparatus according to claim 8, wherein the processing circuitry is configured to:

obtain a relationship of merged controls associated with the third graphical element in response to a split setting operation on the third graphical element in the GUI, the merged controls being of a same control type;

split the merged controls into the first control and the second control based on the relationship; and update the GUI with the first graphical element associated with the first control and the second graphical element associated with the second control.

14. The apparatus according to claim 8, wherein a picture of the virtual environment is obtained from a perspective of the first virtual object and the processing circuitry is configured to:

split, in response to that the picture comprises at least two second virtual objects, merged controls associated with a fourth graphical element for controlling the at least two second virtual objects into individual controls for the at least two second virtual objects based on a quantity of the at least two second virtual objects; and update the GUI with separate graphical elements respectively associated with the individual controls for the at least two second virtual objects.

15. A non-transitory computer-readable storage medium storing instructions which when executed by at least one processor cause the at least one processor to perform:

providing a graphical user interface (GUI) of a virtual environment, the GUI comprising a first graphical element and a second graphical element, the first graphical element being associated with a first control for a first virtual object and the second graphical element being associated with a second control for the first virtual object, wherein the first graphical element is used for controlling the first virtual object to perform a first action and the second graphical element is used for controlling the first virtual object to perform a second action;

receiving a merge setting operation for the first graphical element and the second graphical element;

merging the first control and the second control into a third graphical element in response to the merge setting operation; and updating the GUI with the third graphical element that replaces the first graphical element and the second graphical element, wherein the third graphical element is used for controlling the first virtual object to perform at least one of the first action or the second action.

16. The non-transitory computer-readable storage medium according to claim 15, wherein the instructions cause the at least one processor to perform:

obtaining a first control type of the first control and a second control type of the second control in response to the merge setting operation; and merging the first control and the second control into the third graphical element in response to that the first control type and the second control type meet a preset condition.

17. The non-transitory computer-readable storage medium according to claim 16, wherein the preset condition comprises at least one of:

the first control type is an auxiliary type and the second control type is an aiming type;

the first control type is the auxiliary type and the second control type is a moving type;

the first control type is the moving type and the second control type is the aiming type;

the first control type is the moving type and the second control type is a state switching type;

the first control type is the state switching type and the second control type is the auxiliary type; and the first control type is the state switching type and the second control type is the aiming type.

18. The non-transitory computer-readable storage medium according to claim 15, wherein the instructions cause the at least one processor to perform:

controlling, in response to a first operation on the third graphical element, the first virtual object to perform the first action; and controlling, in response to a second operation on the third graphical element, the first virtual object to perform the second action;

controlling, in response to a third operation on the third graphical element, the first virtual object to simultaneously perform the first action and the second action; or obtaining priorities of the first action and the second action in response to a fourth operation on the third graphical element; and controlling, according to the priorities, the first virtual object to perform the first action and the second action in a preset order.

19. The non-transitory computer-readable storage medium according to claim 15, wherein the instructions cause the at least one processor to perform:

obtaining different control types of merged controls associated the third graphical element in response to a split setting operation on the third graphical element in the GUI;

splitting the merged controls associated with the third graphical element into at least the first control and the second control based on the different control types; and updating the GUI with the first graphical element associated with the first control and the second graphical element associated with the second control.

20. The non-transitory computer-readable storage medium according to claim 15, wherein the instructions cause the at least one processor to perform:

obtaining a relationship of merged controls associated with the third graphical element in response to a split setting operation on the third graphical element in the GUI, the merged controls being of a same control type;

splitting the merged controls into the first control and the second control based on the relationship; and updating the GUI with the first graphical element associated with the first control and the second graphical element associated with the second control.

* * * * *